(12) United States Patent
Park

(10) Patent No.: US 9,135,209 B2
(45) Date of Patent: Sep. 15, 2015

(54) APPARATUS AND METHOD FOR EXCHANGING DATA BETWEEN UPNP BASED DEVICES

(75) Inventor: Ho-Yeon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 417 days.

(21) Appl. No.: 13/526,074

(22) Filed: Jun. 18, 2012

(65) Prior Publication Data

US 2012/0324046 A1 Dec. 20, 2012

(30) Foreign Application Priority Data

Jun. 17, 2011 (KR) .................. 10-2011-0058971
Jun. 15, 2012 (KR) .................. 10-2012-0064078

(51) Int. Cl.
*G06F 15/16* (2006.01)
*G06F 13/00* (2006.01)
*H04L 12/24* (2006.01)

(52) U.S. Cl.
CPC ............... *G06F 15/16* (2013.01); *G06F 13/00* (2013.01); *H04L 12/2427* (2013.01); *H04L 41/0809* (2013.01)

(58) Field of Classification Search
CPC ............................... G06F 15/16; G06F 13/00
USPC ............................................ 709/217
See application file for complete search history.

(56) References Cited

U.S. PATENT DOCUMENTS

| | | | |
|---|---|---|---|
| 7,085,814 B1 * | 8/2006 | Gandhi et al. .................. | 709/208 |
| 7,089,307 B2 * | 8/2006 | Zintel et al. .................... | 709/224 |
| 2002/0027569 A1 * | 3/2002 | Manni et al. .................... | 345/764 |
| 2003/0105854 A1 * | 6/2003 | Thorsteinsson et al. ....... | 709/223 |
| 2005/0021852 A1 * | 1/2005 | Accarie et al. ................. | 709/245 |
| 2005/0022210 A1 * | 1/2005 | Zintel et al. .................... | 719/318 |
| 2005/0245272 A1 * | 11/2005 | Spaur et al. ................. | 455/456.3 |
| 2006/0085835 A1 * | 4/2006 | Istvan et al. .................... | 725/119 |
| 2006/0153072 A1 * | 7/2006 | Bushmitch et al. ........... | 370/230 |
| 2006/0155980 A1 * | 7/2006 | Bodlaender ................... | 713/100 |
| 2006/0293033 A1 * | 12/2006 | Ma et al. .................... | 455/414.1 |
| 2007/0067780 A1 * | 3/2007 | Kumar et al. .................. | 719/318 |
| 2007/0101024 A1 | 5/2007 | Doumuki et al. | |
| 2007/0104193 A1 * | 5/2007 | Choi .............................. | 370/389 |

(Continued)

FOREIGN PATENT DOCUMENTS

| | | | | |
|---|---|---|---|---|
| EP | 1 286 501 | | 2/2003 | |
| KR | 10-2010-0033861 A | * | 9/2008 | .............. H04L 12/12 |

(Continued)

OTHER PUBLICATIONS

Hu et al, Multicast Complement for Efficient UPnP Eventing in Home Computing Network, ??*

(Continued)

*Primary Examiner* — David Lazaro
*Assistant Examiner* — Robert Shaw
(74) *Attorney, Agent, or Firm* — The Farrell Law Firm, P.C.

(57) ABSTRACT

An apparatus and method are provided for exchanging data between Universal Plug and Play (UPnP) based devices. The apparatus includes a controller that generates and transmits a request for a parameter to a controlled device, and receives a response to the request from the controlled device; and a fast event data bus module that establishes a fast event data transmission path, based on information included in the response, and receives fast event data.

20 Claims, 5 Drawing Sheets

(56) References Cited

U.S. PATENT DOCUMENTS

| | | | |
|---|---|---|---|
| 2007/0106921 A1* | 5/2007 | Jin et al. | 713/502 |
| 2007/0149184 A1* | 6/2007 | Viegers et al. | 455/422.1 |
| 2008/0059978 A1* | 3/2008 | Nishio | 719/318 |
| 2008/0288618 A1* | 11/2008 | Vardi et al. | 709/223 |
| 2008/0304408 A1* | 12/2008 | Kraemer et al. | 370/230 |
| 2008/0316941 A1* | 12/2008 | Jung et al. | 370/254 |
| 2009/0132712 A1* | 5/2009 | P et al. | 709/227 |
| 2009/0132731 A1* | 5/2009 | Nakamura | 710/19 |
| 2009/0161579 A1* | 6/2009 | Saaranen et al. | 370/254 |
| 2009/0172133 A1* | 7/2009 | Bodlaender | 709/220 |
| 2009/0207262 A1* | 8/2009 | Kurosawa | 348/211.99 |
| 2009/0257432 A1* | 10/2009 | Yamaguchi et al. | 370/390 |
| 2009/0304019 A1* | 12/2009 | Chan | 370/432 |
| 2009/0306834 A1* | 12/2009 | Hjelm et al. | 701/1 |
| 2010/0036941 A1* | 2/2010 | Rahman et al. | 709/224 |
| 2010/0042233 A1* | 2/2010 | Han et al. | 700/90 |
| 2010/0064351 A1* | 3/2010 | Johansson et al. | 726/4 |
| 2010/0095332 A1* | 4/2010 | Gran et al. | 725/93 |
| 2010/0205615 A1* | 8/2010 | Kim et al. | 719/318 |
| 2011/0010591 A1* | 1/2011 | Damola et al. | 714/57 |
| 2011/0113169 A1* | 5/2011 | Maeng et al. | 710/106 |
| 2011/0119346 A1* | 5/2011 | Kim et al. | 709/217 |
| 2012/0156991 A1* | 6/2012 | Burton et al. | 455/40 |
| 2013/0108113 A1* | 5/2013 | Zhao et al. | 382/103 |

FOREIGN PATENT DOCUMENTS

| | | | | |
|---|---|---|---|---|
| KR | 1020100033861 | | 3/2010 | |
| WO | WO 2005027412 A1 * | | 3/2005 | H04L 12/24 |
| WO | WO 2005/041486 | | 5/2005 | |

OTHER PUBLICATIONS

Newmarch, "A RESTful approach: Clean UPnP without SOAP," (CCNC'05), IEEE, Jan. 2005, pp. 134-138.*

D. de Jong, Machine 2 machine communication, TUE Thesis, Nov. 2005.*

C. Lee, "Context-Aware, Ubiquitous Service Discovery and Delivery for Mobile Clients", Thesis, University of Florida 2003.*

UPnP Device Architecture 1.1 (Oct. 15, 2008) ("UDA").*

UPnP, ConfigurationManagement Service Template Version 1.0.1 Standardized DCP (SDCP) Jul. 20, 2010 ("CMS").*

UPnP Device Management—Simplify the Administration of Your Devices, UPnP Whitepaper (Apr. 2011).*

Miller et al , Home Networking with Universal Plug and Play, IEEE Communications Magazine, vol. 39 No. 12., Dec. 2001.*

Saif et al, Internet Access to a Home Area Network, IEEE Internet Computing, Jan.-Feb. 2001.*

Cohen et al, General Event Notification Architecture Base, IETF, Jul. 1998 <draft-cohen-gena-p-base-01.txt>.*

Cohen et al, General Event Notification Architecture Base: Client to Arbiter, IETF, Jun. 1999 <draft-cohen-gena-client-00.txt>.*

Goland, Multicast and Unicast UDP HTTP Messages, IETF, Jun. 1999 <draft-goland-http-udp-00.txt>.*

D. Meyer, "Administratively Scoped IP Multicast," RFC2365, IETF Jul. 1998.*

Cohen et al, General Event Notification Architecture Base: Client to Arbiter. 1999.*

Mazuryk and Lukkien, Improved Eventing Protocol for Universal Plug and Play, in Proc. 5th PROGRESS Symp. Embedded Sys. PROGRESS/STW, (Oct. 2004), pp. 114-121.*

Mazuryk and Lukkien, Analysis and improvements of the eventing protocol for universal plug and play, ICIT, Nov. 2004.*

Lukkien, et all. An Architecture for Web-Enabled Devices. In proceedings of the 2001 International Conference on Internet Computing, (2001).*

Lukkien et al, Implementation and validation of UPnP for embedded systems in a home environment ICIT 2002.*

UPnP Device Architecture 1.1 UPnP Forum, Oct. 15, 2008.*

UPnP, ConfigurationManagement Service Template Version 1.0.1 Standardized DCP (SDCP) UPnP Forum, Jul. 20, 2010.*

UPnP, ManageableDevice:1 Device Document, UPnP Forum, Jul. 20, 2010.*

Hu et al, Multicast Complement for Efficient UPnP Eventing in Home Computing Network PORTABLE'07, IEEE, May 2007.*

D.P.H. de Jong, "Machine 2 Machine Communication—Remote Monitoring and Management", LogicaCMG, 2005.*

European Search Report dated Nov. 20, 2014 issued in counterpart application No. 12800112.0-1862.

\* cited by examiner

APPARATUS AND METHOD FOR EXCHANGING DATA BETWEEN UPNP BASED DEVICES

PRIORITY

This application claims priority under 35 U.S.C. §119(a) to Korean Patent Application Serial Nos. 10-2011-0058971 and 10-2012-0064078, which were filed in the Korean Intellectual Property Office on Jun. 17, 2011 and Jun. 15, 2012, respectively, the content of each of which is hereby incorporated by reference.

BACKGROUND OF THE INVENTION

1. Field of the Invention

The present invention relates generally to an apparatus and a method for exchanging data, and more particularly, to an apparatus and a method for exchanging data between Universal Plug and Play (UPnP) based devices.

2. Description of the Related Art

UPnP ( ) technology is used for exchanging data between devices. The UPnP technology expands upon Plug and Play (PnP) technology used in a conventional computer system to a dynamic service interworking technology based on a network.

Devices supporting UPnP technology are generally classified into a control point and a controlled device, based on an ability to be a subject of the control. A control point searches for or controls other devices, and a controlled device performs a service provided by the controlled device itself, under a control of the control point. In general, the control point and the controlled device perform networking including an addressing process, a discovery process, a description process, a control process, and an eventing process.

FIG. 1 illustrates a conventional UPnP protocol stack.

Referring to FIG. 1, the UPnP protocol stack 10 includes an Internet Protocol (IP) 12, a Transmission Control Protocol (TCP) 14, a Hypertext Transfer Protocol (HTTP) 16, a Simple Object Access Protocol (SOAP) 18, and a General Event Notification Architecture (GENA) 19, and the control point and the controlled device exchange data based on the UPnP protocol stack 10.

More specifically, the control point communicates with other devices on a network through the IP 12 and the TCP 14, and performs the address process and the discovery process of searching for and inquiring other devices on the network through IP addresses.

Further, the control point requests a specification file (service description eXtensible Markup Language (XML) file or device description XML file) of a device through an IP address of the controlled device in order to recognize a service provided by the controlled device, and receives the specification file of the device from the controlled device. The control point recognizes the service provided by the controlled device by analyzing the specification file of the device provided by the controlled device.

Further, in order to execute a service through the controlled device, the control point transmits a control action message requesting an execution of the service provided by the controlled device to the controlled device and receives a control response message from the controlled device having received the corresponding control action message. Here, the control action message and the control response message are expressed using XML through the SOAP 18.

Additionally, the control point performs the eventing process of identifying whether an event of the controlled device providing a predetermined service through the control action message is generated, i.e., whether there is a change in a state of the controlled device. When the control point transmits a SOAP message for requesting a subscription to identify the change in the state of the controlled device to the controlled device, the controlled device transmits an event message of a text type to the control point using the GENA 18, in order to inform of the change in the state of the controlled device.

As described above, when exchanging data based on the conventional UPnP protocol stack 10, a control related message, such as the control action message and the control response message, are transmitted and received between the control point and the controlled device using the SOAP 18, and the controlled device transmits the event message to the control point by using the GENA 19. Here, the GENA 19 is used for exchanging the event message between the devices, and the SOAP 18 refers to a protocol for transmitting the control command to the device using XML.

According to the method of exchanging the data based on the aforementioned conventional UPnP protocol stack 10, because the UPnP protocol 10 was developed mainly for a control network, the UPnP is conveniently used for exchanging a one-shot control related message between devices included in the network by using the protocol, such as the SOAP 18, of the UPnP 10, but is not suitable for periodically transmitting and receiving two-way data at a high speed.

More specifically, although it is convenient to transmit and receive the control action message and the control response message between the control point and the controlled device using the SOAP 18, the SOAP 18 is not suitable for periodically transmitting and receiving binary data at a high speed because the SOAP 18 uses an attachment method based on a base 64 encoding in transmitting and receiving the binary data.

Further, the controlled device transmits an event message to a control point using the GENA 19, but the GENA 19 supports only a one-way transmission in which the event message is transmitted to all control points connected to the UPnP network in a multicast scheme. Accordingly, the GENA 19 is not suitable for periodically transmitting and receiving two-way binary data between the control point and the controlled device at a high speed. Consequently, exchanging two-way data between the control point and the controlled device using the SOAP 18 and the GENA 19 is inefficient and not fast enough.

SUMMARY OF THE INVENTION

The present invention is designed to address at least the problems and/or disadvantages described above and to provide at least the advantages described below.

Accordingly, an aspect of the present invention is to provide an apparatus and a method for exchanging two-way data between UPnP devices using a UPnP at a high speed in real time.

Another aspect of the present invention is to provide an apparatus and a method for exchanging data between a vehicle head unit and a mobile device using a UPnP at a high speed in real time.

In accordance with an aspect of the present invention, an apparatus is provided for exchanging data between UPnP based devices. The apparatus includes a controller for generating and transmitting an action for requesting a particular parameter to a controlled device, and controlling such that a fast event data transmission path is established using information contained in a return when the return in response to the action for requesting the particular parameter is received from the controlled device; and a fast event data bus module for establishing the fast event data transmission path according to a control of the controller and receiving fast event data.

In accordance with another aspect of the present invention, an apparatus is provided for exchanging data between UPnP based devices. The apparatus includes a controlled unit for transmitting a return in response to an action for requesting a particular parameter when the action for requesting the particular parameter is received from a control point, and controlling such that a fast event data transmission path is established with the control point; and a fast event data bus module for establishing the fast event data transmission path according to a control of the control point, and transmitting the fast event data.

In accordance with another aspect of the present invention, a method is provided for exchanging data between UPnP based devices. The method includes generating and transmitting an action for requesting a particular parameter to a controlled device, by a control point; receiving a return in response to the action for requesting the particular parameter from the controlled device; establishing a fast event data transmission path by using information contained in the return; and receiving fast event data through the fast event data transmission path.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to an embodiment of the present invention, an apparatus it provided for exchanging data between UPnP based devices including a control point and a controlled device. The control point and the controlled device included in the apparatus for exchanging the data between the UPnP based devices may include any device which can exchange data based on the UPnP.

In this specification, a vehicle head unit is installed in the vehicle in order to provide various types of entertainment in the vehicle and a mobile device, such as a smart phone, are described as examples of the control point and the controlled device. According to an embodiment of the present invention, the vehicle head unit may be operated as the control point and the mobile device may be operated as the controlled device, or the mobile device may be operated as the control point and the vehicle head unit may be operated as the controlled device.

Figure 1:
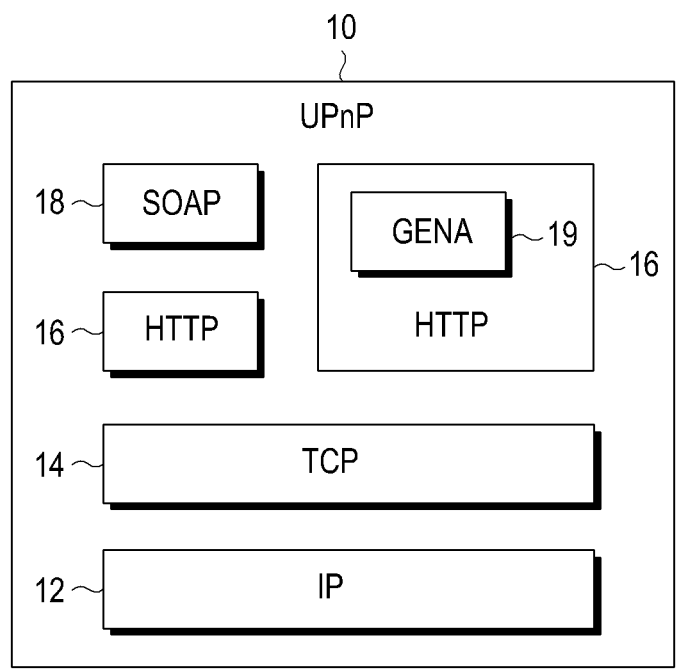
FIG. 1 illustrates a conventional UPnP protocol stack.
Figure 2:
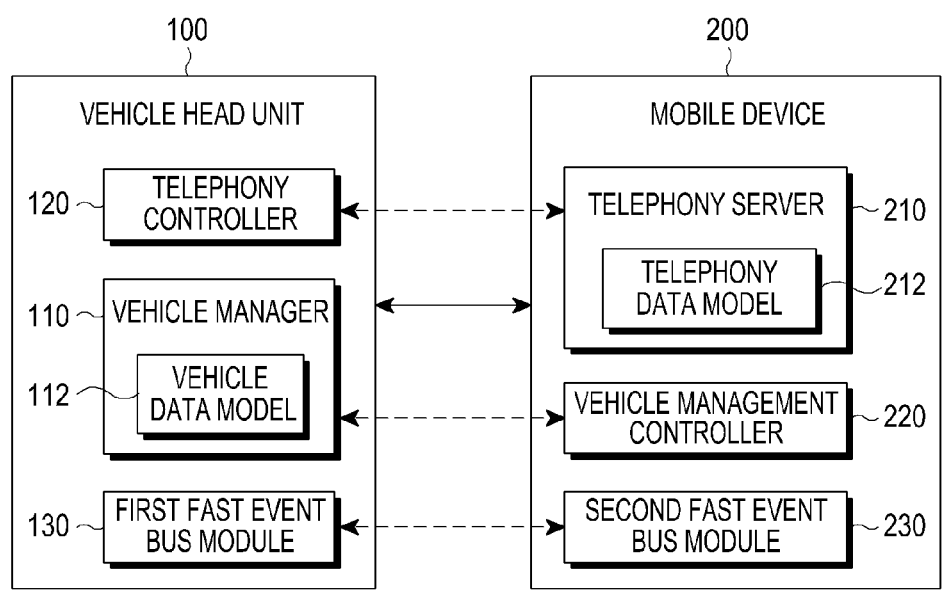
FIG. 2 is a block diagram illustrating an apparatus for exchanging data between UPnP based devices according to an embodiment of the present invention.

FIG. 2 is a block diagram illustrating an apparatus for exchanging data between UPnP based devices according to an embodiment of the present invention.

Referring to FIG. 2, a vehicle head unit 100 exchanges data based on UPnP through an interworking with a mobile device 200. The vehicle head unit 100 includes a vehicle manager (or vehicle manageable device) 110, a telephony controller 120, and a first fast event bus module 130.

The vehicle manager 110 performs various types of functions within the vehicle. For example, the vehicle manager 110 performs a navigation function by receiving a Global Positioning Satellite (GPS) signal, outputs a Digital Multimedia Broadcasting (DMB) radio signal or a DMB TV signal, or performs mobile communication through a mobile communication antenna (not shown). Further, the vehicle manager 110 can also perform a car audio and video functions, and other functions provided by the vehicle.

The vehicle manager 110 includes a vehicle data model 112 for performing various types of functions within the vehicle. The vehicle data model 112 stores parameter values for performing the navigation function, the DMB function, the mobile communication function, and the car audio and video function, and parameter values corresponding to events generated while the navigation function, the DMB function, the mobile communication function, and the car audio and video function are performed.

The vehicle manager 110 is a controlled unit when the vehicle head unit 110 is operated as the controlled device, and receives an action for requesting a particular parameter among the parameter values stored in the vehicle data model 112 from a vehicle management controller 220 of the mobile device 200, which is operated as the control point.

When the vehicle manager 110 receives a request for a particular parameter from the vehicle management controller 220 of the mobile device 200, the vehicle manager 110 analyzes parameters within the corresponding request, calculates values that can be transmitted, and transmits a return indicating information on the values that can be transmitted.

After the vehicle manager 110 transmits the return, when the first fast event bus module 130 and a second fast event bus module 230 are connected to each other, the vehicle manager 110 transmits the values that can be transmitted among the particular parameter to the mobile device 200 through a fast event data transmission path between the first fast event bus module 130 and the second fast event bus module 230.

Further, when the vehicle manager 110 receives a request for a parameter transmission stop from the vehicle management controller 220, the vehicle manager 110 transfers a result informing of the parameter transmission stop to the vehicle management controller 220.

The telephony controller 120 controls the controlled device when the vehicle head unit 100 is operated as the control point, and performs a control for receiving a particular parameter from a telephony server 210 of the mobile device 200, i.e., the controlled device.

Specifically, the telephony controller 120 generates a request for a particular parameter that the telephony controller 120 desires to receive from the telephony server 210 of the mobile device 200, and transmits the generated request to the telephony server 210 of the mobile device 200. When the telephony controller 120 receives a return in response to the request from the mobile device 200, the telephony controller 120 receives fast event data, i.e., a value provided among the requested particular parameter through the fast event data transmission path between the first fast event bus module 130 and the second fast event bus module 230 using information included in the return.

Further, the telephony controller 120 transmits a request for a parameter transmission stop to the telephony server 210, when the parameter transmission stop is desired, and receives a result informing of the parameter transmission stop from the telephony server 210.

For example, the request for the particular parameter may be a Start Fast Event Query Action including a parameter name, a parameter reception period type, a parameter reception period, a parameter reception duration type, parameter reception duration, and a Uniform Resource Locator (URL) value corresponding to a parameter reception address. Further, the return in response to the request may be a Return-Start Fast Event Query Action including an IDentifier (ID) for distinguishing parameters, a parameter transmission period, and parameter transmission duration.

When the first fast event bus module 130 receives a fast event transmission path call signal from the second fast event bus module 230, as the vehicle manager 110 transmits the return in response to the action for requesting the particular parameter to the vehicle management controller 220, the first fast event bus module 130 is connected to the second fast event bus module 230 according to the call signal. Further, the first fast event bus module 130 receives a value that can be transmitted among the particular parameter through the fast event data transmission path between the first fast event bus module 130 and the second fast event bus module 230, and provides the received value to the vehicle management controller 220 of the mobile device 200.

The mobile device 200 exchanges data based on the UPnP through an interworking with the head unit 100 included in the vehicle (not shown).

The mobile device 200 includes the telephony server 210, the vehicle management controller 220, and the second fast event bus module 230. The telephony server 210 performs various types of functions within the mobile device 200. For example, the telephony server 210 performs a telephony function through mobile communication, an Internet browsing function, a function for providing one or more application services, or a function for reproducing audio and video.

The telephony server 210 includes the telephony data model 212 for performing various types of functions within the mobile device 200. The telephony data model 212 stores parameter values required for performing a telephony function, a function of transmitting/receiving a Short Message Service (SMS), an internet browsing function, and a function of providing one or more application services through various types of applications, or a function of reproducing audio and video and parameter values corresponding to an event generated while the telephony function, the SMS transmission/reception function, the internet browsing function, various application service function, and the audio and video reproduction function are performed.

When the mobile device 200 is operated as the controlled device, the telephony server 210 may be the controlled unit that receives a request for a particular parameter among the parameter values stored in the telephony data model 212 from the telephony controller 120 of the vehicle head unit 100, which is operated as the controller. When the telephony server 210 receives the request, the telephony server 210 calculates values, which can be transmitted, by analyzing parameters within the corresponding request and transmits a return indicating information on the values, which can be transmitted.

After the telephony server 210 transmits the return, when the first fast event bus module 130 and the second fast event bus module 230 are connected to each other, the telephony server 210 transmits the values that can be transmitted among the particular parameter to the vehicle head unit 100 through the fast event data transmission path between the first fast event bus module 130 and the second fast event bus module 230. Further, when the parameter transmission stop is required, the vehicle management controller 220 transmits a request for the parameter transmission stop to the vehicle manager 110 and receives a result informing of the parameter transmission stop from the vehicle manager 110.

For example, the request for the particular parameter may be a Start Fast Event Query Action including a parameter name, a parameter reception period type, a parameter reception period, a parameter reception duration type, parameter reception duration, and a URL value corresponding to a parameter reception address. Further, the return may be a Return-Start Fast Event Query Action including an ID for distinguishing parameters, a parameter transmission period, and parameter transmission duration.

When the second fast event bus module 230 receives a fast event transmission path call signal from the first fast event bus module 130, as the telephony server 210 transmits the return in response to the request for the particular parameter to the telephony controller 120, the second fast event bus module 230 is connected to the first fast event bus module 130 according to the call signal. Further, the second fast event bus module 230 receives the fast event data, i.e., the particular parameter value through the fast event data transmission path between the first fast event bus module 130 and the second fast event bus module 230.

Figure 3:
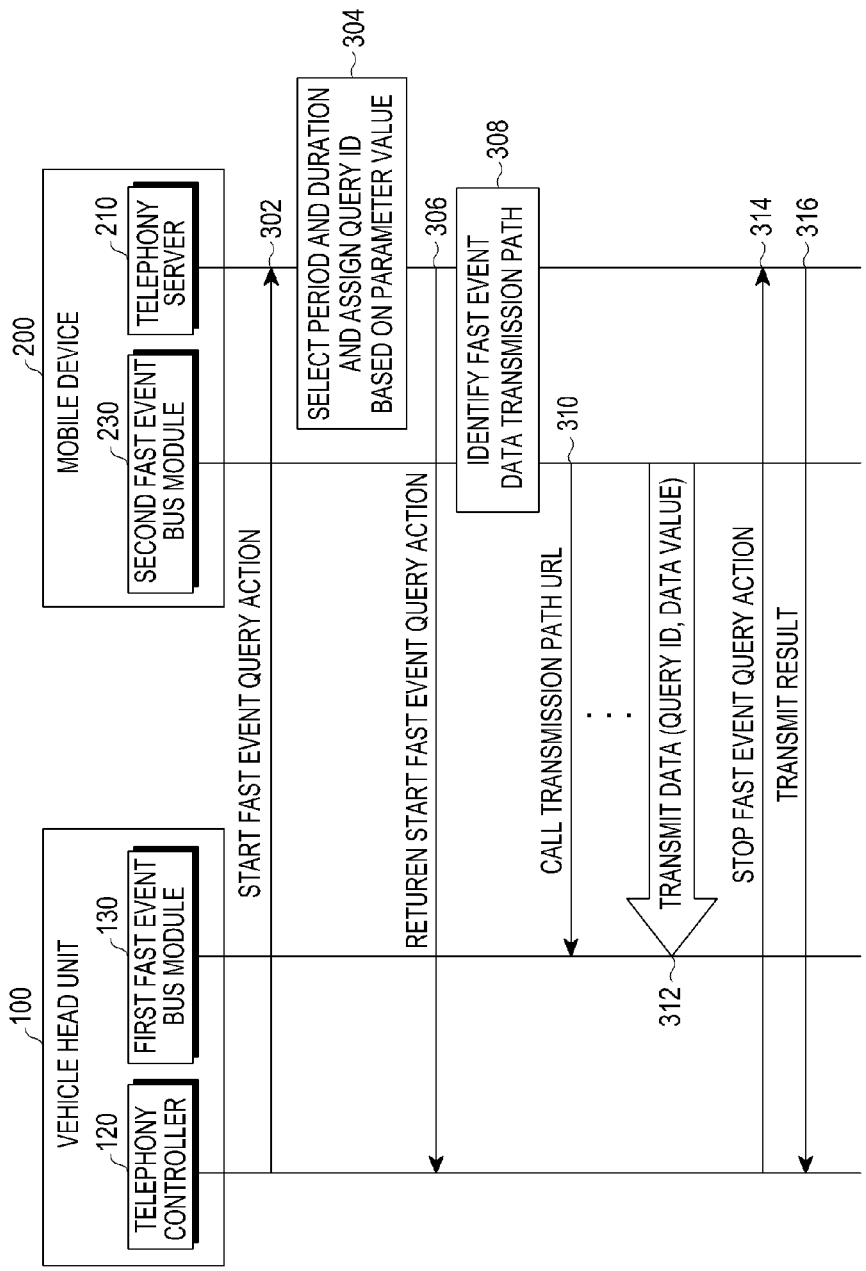
FIG. 3 is a signal flow diagram illustrating a method for exchanging data between UPnP based devices according to an embodiment of the present invention.

FIG. 3 is a signal flow diagram illustrating a method for exchanging data between UPnP based devices according to an embodiment of the present invention. Specifically, in FIG. 3, the vehicle head unit 100 is operated as the control point and the mobile device 200 is operated as the controlled device.

Referring to FIG. 3, the vehicle head unit 100 performs an infotainment service by receiving parameter values for performing a telephony function, an SMS transmission/reception function, an internet browsing function, a function for providing various application services, and an audio and video reproduction function in the telephony server 210 of the mobile device through the telephony controller 120 or parameter values corresponding to the event generated, while the above-described functions are performed.

More particularly, the telephony controller 120 generates the Start Fast Event Query Action for requesting a parameter that the telephony controller 120 desires to receive from the telephony server 210 of the mobile device 200 and transmits the Start Fast Event Query Action to the telephony server 210 of the mobile device 200 in step 302.

For example, the Start Fast Event Query Action includes the parameter name (ParameterName), the parameter reception period type (PeriodType), the parameter reception period (Period), the parameter reception duration type, the parameter reception duration (Duration), and the URL value corresponding to the parameter reception address as shown in Table 1, below.

TABLE 1

<Start Fast Event Query Action>

ParamterName: a parameter name (a value which the telephony data model 212 desires to periodically and quickly receive (e.g. UPnP/Telephony/GPSLocation))
PeriodType: a parameter reception period type (e.g., a time or a distance)
Period: a parameter reception period (e.g., a value indicating whether to receive the parameter on a cycle of 1000 ms or 100 ms)
DurationType: a parameter reception duration type (e.g., a value indicating whether to determine a reception stop condition by a time or a distance)
Duration: parameter reception duration (e.g., a value indicating whether to receive the parameter for one hour or to receive the parameter within a range of 100 km)
Fast Event Bus URL: a parameter reception address URL (a URL address for connecting the fast event data path from the mobile device 200 to the vehicle head unit 100)

When the Start Fast Event Query Action is received, the telephony server 210 analyzes the requested parameter based on the requested parameter value, calculates parameter values that can be transmitted, selects a parameter transmission period and parameter transmission duration for the transmission parameter, and generates a query ID to identify the requested parameter value in step 304.

In step 306, the telephony server 210 transmits the return indicating transmission information on the parameter that can be transmitted, i.e., the Return-Start Fast Event Query Action to the telephony controller 120, in response to the Start Fast Event Query Action.

For example, the Return-Start Fast Event Query Action includes the ID (Query ID), the parameter transmission period (Period), and the parameter transmission duration (Duration), as shown in Table 2, below.

TABLE 2

<Return-Start Fast Event Query Action>

Query ID: an ID for distinguishing parameters
Period: a parameter transmission period (e.g., a value whether to transmit the parameter on a cycle of 1000 ms or 100 ms)
Duration: parameter transmission duration (e.g., a value indicating whether to transmit the parameter for one hour or to transmit the parameter within a range of 100 km)

The telephony controller 120 identifies a transmission period and transmission duration during which the telephony server 110 transmits a parameter from the received Return-Start Fast Event Query Action.

In step 308, after transmitting the Return-Start Fast Event Query Action to the telephony controller 12, the telephony server 210 identifies the fast event data transmission path through which the parameter is to be transmitted. For example, the telephony server 210 identifies whether or not a fast event data path was pre-connected between the vehicle head unit 100 and the mobile device 200.

When there is no connected fast event data path, in step 310, the telephony server 210 calls the Fast Event Bus URL included in the Start Fast Event Query Action through the second fast event bus module 230 and connects the second fast event bus module 230 with the first fast event bus module 130, such that the fast event data path is established.

In step 312, the telephony server 210 transmits the fast event data, i.e., a Query ID for distinguishing parameters and a Data Value corresponding to the corresponding parameter value to the vehicle head unit 100 through the fast event data path.

For example, the Query ID and the corresponding Data Value include values as shown in Table 3, below.

TABLE 3

<Data Transmission>

Query ID: an ID for distinguishing parameters
Data Value: an actual value of a data model corresponding to ParameterName (e.g., when a GPS value is requested, $GPGSV,2,1,08,01,40,083,46,02,17,308,14,22,228,45*75)

In the data transmission, a related stack may be configured such that a TCP or a User Datagram Protocol (UDP) packet is based on an IP and transmission data can be expressed using a string value, such as binary values of the Query ID and the Data Value or the XML value, as shown in Table 3.

When the telephony controller 120 desires to stop fast event data communication, while receiving the data value corresponding to the parameter through the fast event data path, the telephony controller 120 transmits a Stop Fast Event Query Action to the telephony server 210 in step 314. For example, the Stop Fast Event Query Action includes a Query ID value for the event desired to be stopped.

When the telephony server 210 receives the Stop Fast Event Query Action, the telephony server 210 stops transmitting data and transmits a data transmission stop result to the telephony controller 120 in step 316. Accordingly, the data transmission is stopped.

Figure 4:
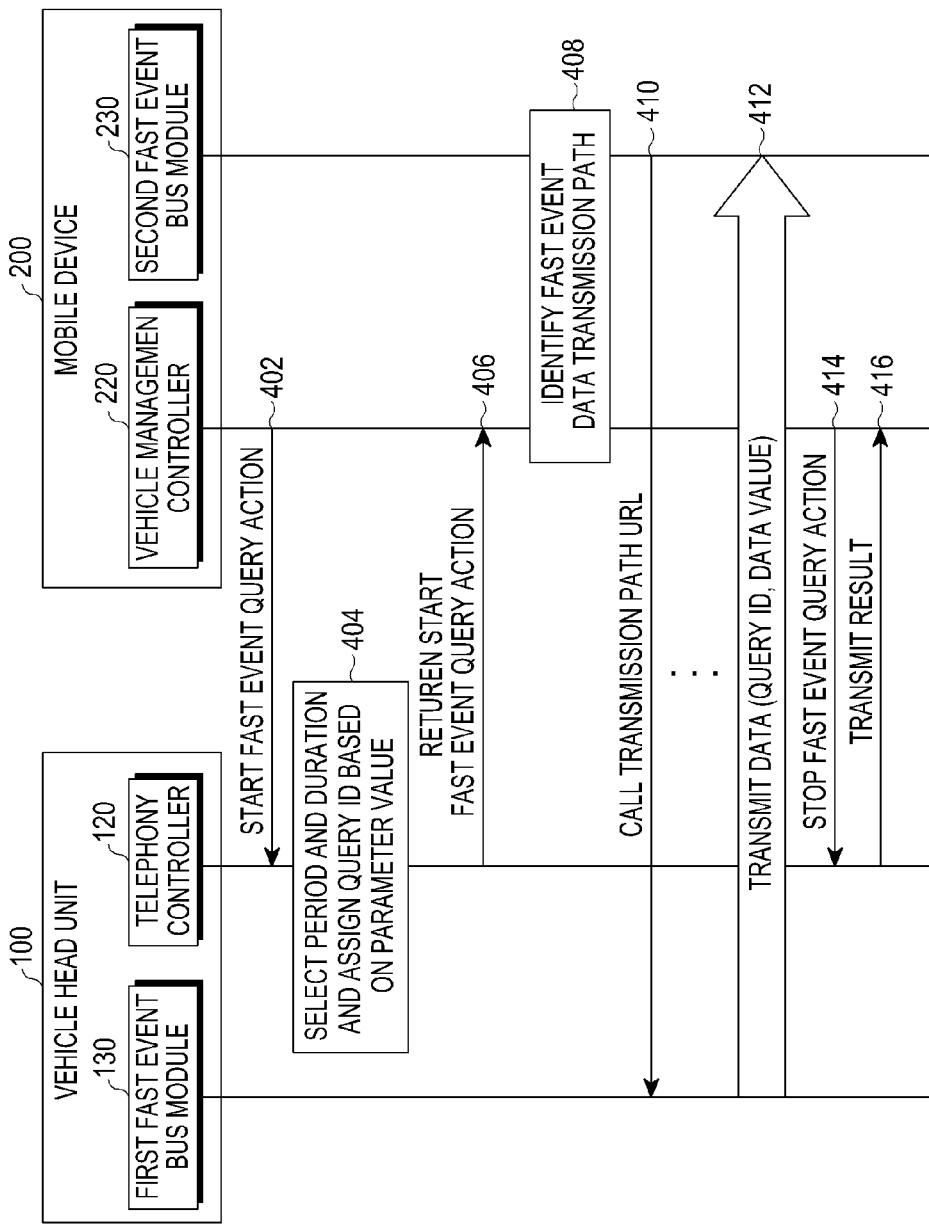
FIG. 4 is a signal flow diagram illustrating a method for exchanging data between UPnP based devices according to an embodiment of the present invention.

FIG. 4 is a signal flow diagram illustrating a method for exchanging data between UPnP based devices according to an embodiment of the present invention. Specifically, in FIG. 4, the mobile device 200 is operated as the control point and the vehicle head unit 100 is operated as the controlled device.

Referring to FIG. 4, the mobile device 200 performs various types of infotainment services by periodically and quickly receiving a desired parameter among parameter values corresponding to an event generated while the navigation function, the DMB function, the mobile communication function, and the car audio and video function in the vehicle manager 110 of the vehicle head unit 100 through the vehicle management controller 220.

Accordingly, the vehicle management controller 220 generates a Start Fast Event Query Action requesting a parameter desired to be received from the vehicle manager 100 of the vehicle head unit 100 and transmits the Start Fast Event Query Action to the vehicle manager 110 in step 402.

For example, the Start Fast Event Query Action includes the parameter name (ParameterName), the parameter reception period type (PeriodType), the parameter reception period (Period), the parameter reception duration type, and the parameter reception duration (Duration). The parameter reception address URL (Fast Event Bus URL) value may be included in the Return-Start Fast Event Query Action. For example, the Start Fast Event Query Action may include values as shown in Table 4, below.

TABLE 4

<Start Fast Event Query Action>

ParameterName: a parameter name (a value that the vehicle data model 112 desires to periodically and quickly receive (e.g., UPnP/CAR/GPSLocation))
PeriodType: a parameter reception period type (e.g., a time or a distance)
Period: a parameter reception period (e.g., a value indicating whether to receive the parameter on a cycle of 1000 ms or 100 ms)
DurationType: a parameter reception duration type (e.g., a value indicating whether to determine a reception stop condition by a time or a TABLE 4-continued <Start Fast Event Query Action> distance)
Duration: a parameter reception period (e.g., a value indicating whether to receive the parameter for one hour or to receive the parameter within a range of 100 km)

When receiving the Start Fast Event Query Action, the vehicle manager 110 analyzes the requested parameter based on the requested parameter value, calculates the parameter value that can be transmitted, selects the parameter transmission period and the parameter transmission duration for the transmission parameter, and generates the Query ID for identifying the requested parameter value in step 404.

In step 406, the vehicle manager 110 transmits the Return indicating transmission information on the parameter that can be transmitted in response to the Start Fast Event Query Action, i.e., the Return-Start Fast Event Query Action to the vehicle management controller 220.

For example, the Return-Start Fast Event Query Action includes the Query ID for distinguishing parameters, the parameter transmission period (Period), the parameter transmission duration (Duration), and the parameter transmission address URL (Fast Event Bus URL), as shown in Table 5 below.

TABLE 5

<Return-Start Fast Event Query Action>

Query ID: an ID for distinguishing parameters
Period: a parameter transmission period (e.g., a value whether to transmit the parameter on a cycle of 1000 ms or 100 ms)
Duration: parameter transmission duration (e.g., a value indicating whether to transmit the parameter for one hour or to transmit the parameter within a range of 100 km)
Fast Event Bus URL: a parameter transmission address URL (a URL address for connecting the fast event data path from the mobile device 200 to the vehicle head unit 100)

The vehicle management controller 220 identifies a transmission period and transmission duration during which the vehicle manager 110 transmits a parameter from the received Return-Start Fast Event Query Action. Particularly, the vehicle management controller 220 identifies the URL address for connecting the Fast Event data path.

When the vehicle management controller 220 receives the Return-Start Fast Event Query Action, the vehicle management controller 220 identifies the Fast Event data transmission path through which the parameter is to be transmitted in step 408. For example, the vehicle management controller 220 identifies whether or not a Fast Event data path was pre-connected between the vehicle head unit 100 and the mobile device 200.

When there is no connected fast event data path, the vehicle management controller 220 calls the Fast Event Bus URL included in the Return-Start Fast Event Query Action through the second fast event bus module 230 and connects the second fast event bus module 230 with the first fast event bus module 130 so that the fast event data path is established in step 410.

When the fast event data path is established, the vehicle manager 110 transmits the fast event data, i.e., the Query ID for distinguishing parameters and the Data Value corresponding to the corresponding parameter value, to the vehicle head unit 100 through the fast event data path in step 412.

For example, the Query ID and the corresponding Data Value include values as shown in Table 6.

TABLE 6

<Data Transmission>

Query ID: an ID for distinguishing parameters
Data Value: an actual value of a data model corresponding to ParameterName (e.g., when a GPS value is requested, $GPGSV,2,1,08,01,40,083,46,02,17,308,14,22,228,45*75)

Figure 5:
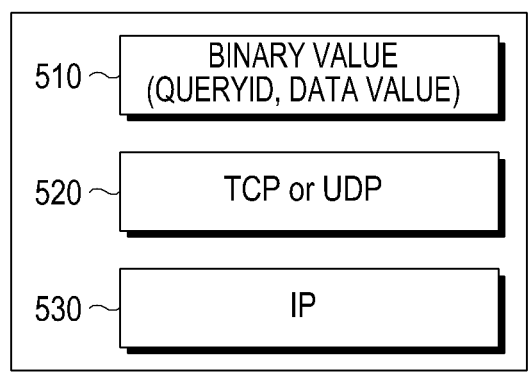
FIG. 5 illustrates a stack for transmitting Fast Event data according to an embodiment of the present invention.

FIG. 5 illustrates a stack for transmitting fast event data according to an embodiment of the present invention.

Referring to FIG. 5, a TCP or a UDP 520 packet is based on an IP 530, and transmission data is expressed using a string value, such as a binary value 510 of the Query ID and the Data Value or an XML value, as shown in Table 6.

As described above, when the vehicle management controller 414 desires to stop fast event data communication while receiving the data value corresponding to the parameter through the fast event data path, in step 414, the vehicle management controller 220 transmits the Stop Fast Event Query Action to the vehicle manager 110.

At this time, the Stop Fast Event Query Action may contain a Query ID value for the event desired to be stopped.

When the Stop Fast Event Query Action is received, the vehicle manager 110 stops transmitting the data, and transmits a result of the data transmission stop to the vehicle management controller 220. Accordingly, the data transmission is stopped.

Based on the apparatus and the method for exchanging the data between the UPnP devices according to the above-described embodiments of the present invention, two-way data exchange is provided between devices through a fast event transmission path by using the UPnP protocol at a high speed in real time, thus providing a more convenient IT service through an interworking between different devices based on the UPnP.

Further, according to the above-described embodiments of the present invention, data exchange between the vehicle head unit 100 and the mobile device 200 is provided through a fast event transmission path at a high speed in real time, thus providing an efficient infotainment service.

While the present invention has been shown and described with reference to certain embodiments thereof, various modifications can be implemented without departing the scope of the present invention. For example, although the above-described embodiments of the present invention refer to the vehicle head unit 100 and the mobile device 200 as examples of the devices, any device supporting the UPnP can be applied to the present invention. Accordingly, it will be understood by those skilled in the art that various changes in form and details may be made therein without departing from the spirit and scope of the present invention as defined by the appended claims and their equivalents.

What is claimed is:

1. An apparatus for exchanging data between Universal Plug and Play (UPnP) based devices, the apparatus comprising:
   a controller that generates a request for a parameter; and
   an interface module that transmits the request to a controlled device over a request transmission path and receives a response to the request from the controlled device,
   wherein the controller establishes a bi-directional event data transmission path different from the request transmission path with the controlled device based on information included in the response, and controls the interface module to receive event data associated with the requested parameter from the controlled device through the event data transmission path by using UPnP, and wherein the information included in the response comprises a period for transmission of the parameter, and a duration for transmission of the parameter.

2. The apparatus of claim 1, wherein the request for the parameter comprises:
    a parameter name of the parameter;
    a period type for reception of the parameter;
    a period for reception of the parameter;
    a duration type for reception of the parameter; and
    a duration for reception of the parameter.

3. The apparatus of claim 2, wherein the response to the request further comprises,
    an IDentifier (ID) for distinguishing the parameter; and
    an address for transmission of the parameter.

4. The apparatus of claim 2, wherein the request for the parameter further comprises an address for reception of the parameter.

5. The apparatus of claim 4, wherein the response to the request further comprises: an IDentifier (ID) for distinguishing the parameter.

6. The apparatus of claim 1, wherein the event data comprises:
    a Query IDentifier (ID) for distinguishing the parameter; and
    a data value corresponding to the parameter.

7. The apparatus of claim 1, wherein the event data comprises a type of Transmission Control Protocol (TCP) or User Datagram Protocol (UDP) packet based on an Internet Protocol (IP), and
    wherein the event data is included in one of a binary value or an eXtensible Markup Language (XML) value within the TCP or the UDP packet.

8. An apparatus for exchanging data between Universal Plug and Play (UPnP) based devices, the apparatus comprising:
    an interface module that receives a request over a request transmission path for a parameter from a control point, and transmits a response to the request to the control point; and
    a controller that establishes a bi-directional event data transmission path different from the request transmission path with the control point based on information included in the request, and controls the interface module to transmit event data associated with the requested parameter to the control point through the event data transmission path by using UPnP, and
    wherein the information included in the response comprises a period for transmission of the parameter, and a duration for transmission of the parameter.

9. The apparatus of claim 8, wherein the request for the parameter comprises:
    a parameter name of the parameter;
    a period type for reception of the parameter;
    a period for reception of the parameter;
    a duration type for reception of the parameter; and
    a duration for reception of the parameter.

10. The apparatus of claim 9, wherein the response to the request further comprises:
    an IDentifier (ID) for distinguishing the parameter; and
    an address for transmission of the parameter.

11. The apparatus of claim 9, wherein the request for the parameter further comprises an address for reception the parameter.

12. The apparatus of claim 11, wherein the response to the request further comprises: an IDentifier (ID) for distinguishing the parameter.

13. The apparatus of claim 8, wherein the event data comprises:
    a Query IDentifier (ID) for distinguishing the parameter; and
    a data value corresponding to the parameter.

14. The apparatus of claim 8, wherein the event data comprises a type of Transmission Control Protocol (TCP) or User Datagram Protocol (UDP) packet based on an Internet Protocol (IP), and
    wherein the event data is included in one of a binary value or an eXtensible Markup Language (XML) value within the TCP or the UDP packet.

15. A method of exchanging data between Universal Plug and Play (UPnP) based devices, the method comprising:
    generating, by a control point, a request for a parameter;
    transmitting the request to a controlled device over a request transmission path;
    receiving a response to the request from the controlled device;
    establishing a bi-directional event data transmission path different from the request transmission path with the controlled device based on information included in the response; and
    receiving event data associated with the requested parameter from the controlled device through the event data transmission path by using UPnP, and
    wherein the information included in the response comprises a period for transmission of the parameter, and a duration for transmission of the parameter.

16. The method of claim 15, further comprising:
    receiving, by the controlled device, the request for the parameter from the control point;
    generating the response to the requesting;
    transmitting the response to the control point;
    establishing the event data transmission path with the control point; and
    transmitting the event data to the control point through the event data transmission path.

17. The method of claim 15, wherein the request for the parameter includes a parameter name of the parameter, a period type for reception of the parameter, a period for reception of the parameter, a duration type for reception of the parameter, and a duration for reception of the parameter.

18. The method of claim 15, wherein the response to the request further includes an IDentifier (ID) for distinguishing the parameter, and an address for transmission of the parameter.

19. method of claim 15, wherein the event data includes a Query IDentifier for distinguishing the parameter and a data value corresponding to the parameter.

20. The method of claim 15, wherein the event data includes a type of Transmission Control Protocol (TCP) or User Datagram Protocol (UDP) packet based on an Internet Protocol (IP), and
    wherein the event data is included in one of a binary value or an eXtensible Markup Language (XML) value within the TCP or the UDP packet.

* * * * *